No. 730,575. Patented June 9, 1903.

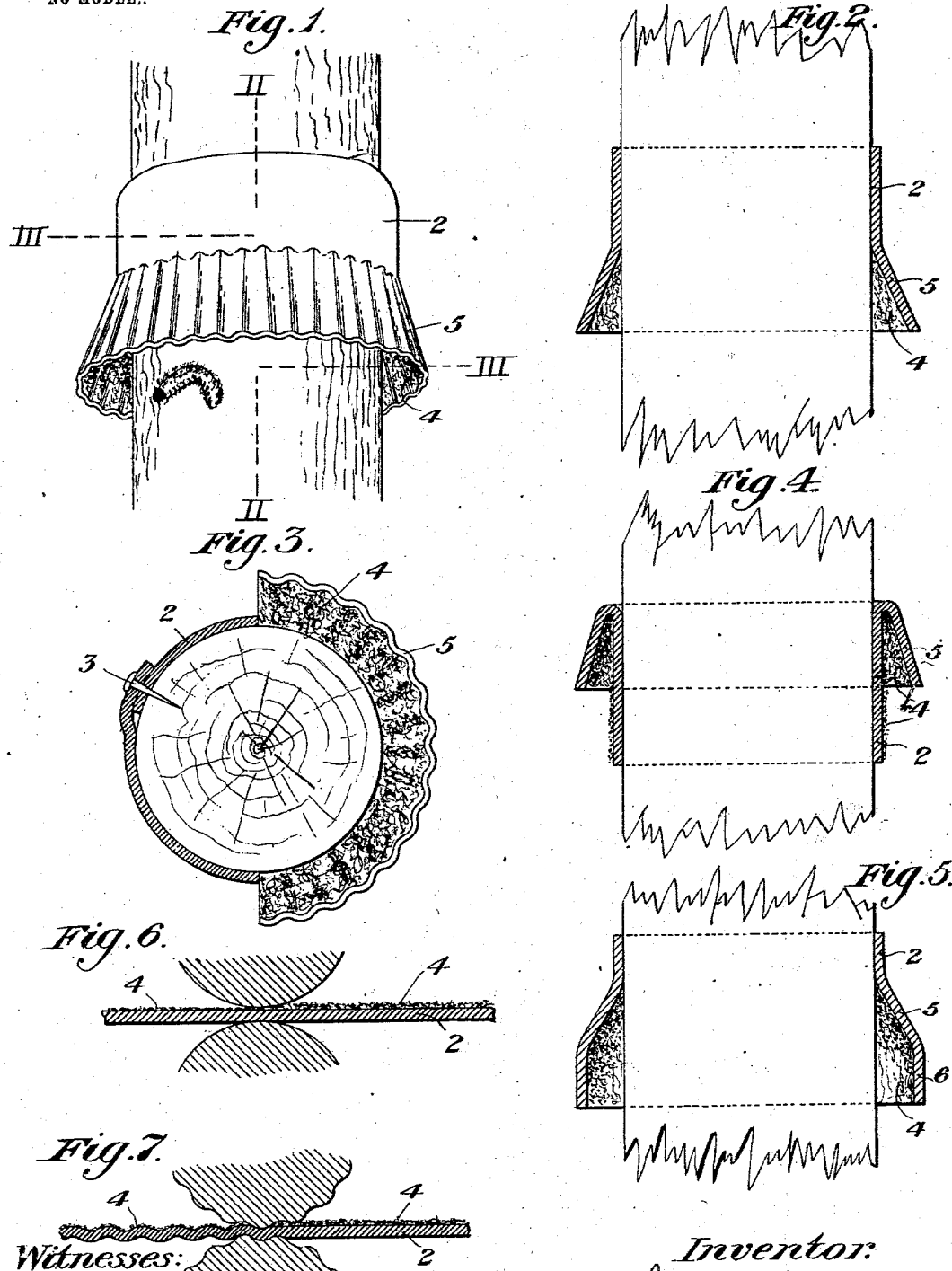

UNITED STATES PATENT OFFICE.

JULIUS SCHIRRA, OF PITTSBURG, PENNSYLVANIA.

TREE-PROTECTOR.

SPECIFICATION forming part of Letters Patent No. 730,575, dated June 9, 1903.

Application filed July 11, 1902. Serial No. 115,199. (No specimens.)

*To all whom it may concern:*

Be it known that I, JULIUS SCHIRRA, a citizen of the United States, residing at Pittsburg, in the county of Allegheny and State of Pennsylvania, have invented certain new and useful Improvements in Tree-Protectors, of which the following is a specification, reference being had therein to the accompanying drawings, forming part of this specification.

Figure 1 is a perspective view showing the application of my invention to the trunk of a tree. Fig. 2 is a vertical sectional view of the device. Fig. 3 is a cross-sectional view on the line III III of Fig. 1. Figs. 4 and 5 are vertical sectional views illustrating modified constructions. Figs. 6 and 7 are sectional views of portions of compressing-rolls, smooth and corrugated, respectively, showing the operation of incorporating the cotton with the body portion of the device.

My invention consists of a protector for the trunks of trees or shrubbery adapted to encircle the trunk or branch and to prevent the passage of insects, caterpillars, &c., the device being made and used in the manner hereinafter described.

Referring to the drawings, 2 is the body portion, of fibrous or other material, as tarpaper, rubber, plaited straw, or other substance of a pliable nature adapted to be formed into a circular band to surround the trunk of a tree. It may be secured in position in any suitable manner, as by a tack or nail 3, driven through the overlapping ends, Fig. 3, or by a securing-clip or other convenient attachment. Upon one or both surfaces is applied a material 4 of a furry nature, such as cotton, which may be made to adhere to the surface of the body by cement or glue or by compressing the two substances together between rollers, as clearly shown in Figs. 6 and 7. This operation may be accomplished by smooth or corrugated rollers, and the securing of the cotton or other material will be facilitated by compressing it upon a base impregnated with a pitchy or resinous substance, as tar-paper, in which case its pliability is increased and any elasticity is eliminated. When corrugated or crimped for a portion of its width only, the material of the base is somewhat elongated, so that when flared out it will assume the form of a sloping hood or coping 5, extending away from the tree trunk and base 2, as clearly shown in Figs. 1, 2, and 3. In Fig. 4 the same effect is produced by reversing the material upon itself, while in Fig. 5 the lower edge 6 is straight for a short distance. The specific form of construction is not, however, essential, inasmuch as various designs or shapes may be used, and any form in which the material of the base first covered on one or both sides is provided with an extended annular portion adapted to project out beyond the tree-trunk will serve the purpose of the invention and is considered to be its substantial equivalent. After having been placed in position around the tree-trunk the inner surface of the hood or both surfaces of the hood or the entire ring may, if desired, be coated with a poisonous or redolent substance or fluid, which will have a repellent effect upon insects.

As is well known, caterpillars and other insects cannot cross cotton or similar material, and the difficulty is greatly increased by the form of the hood, having the interior space between it and the tree-trunk.

The device is quite effective with the cotton or similar lining alone and the poisonous coating may be employed only as an additional precaution, if desired.

The device is made in strips of varying length to suit different diameters of trees. It is very simple and cheap in construction, easy to apply, and is very efficient, retaining its usefulness throughout one or more seasons.

What I claim is—

1. A protecting device for trees formed of a strip of pliable material impregnated with adhesive substance, and having a coating of cotton or the like adhesively held thereto by said adhesive substance, substantially as set forth.

2. A protecting device for trees formed of a strip of pliable material impregnated with adhesive substance, and having a coating of cotton or the like pressed upon the strip and adhesively held thereto by said adhesive substance, substantially as set forth.

3. A protecting device for trees formed of a strip of pliable material impregnated with adhesive substance, and having a coating of cotton or the like incorporated with the strip by said adhesive substance, a portion of the strip and coating being corrugated, substantially as set forth.

4. A protecting device for trees formed of a strip of pliable material impregnated with adhesive substance and having a coating of cotton or the like incorporated with the strip by said adhesive substance, a portion of the strip and coating being corrugated and extended so as to provide a flaring edge, substantially as set forth.

5. A protecting device for trees formed of a strip of tar-paper having a coating of cotton or the like incorporated with the strip and adhesively held thereto by the tar of the paper, substantially as set forth.

6. A protecting device for trees formed of a strip of tar-paper and a coating of cotton or the like adhesively held thereto by the tar of the paper, a portion of the strip and coating being corrugated, and providing an outwardly-extending lengthened hood portion, substantially as set forth.

7. A protecting device for trees formed of a strip of tar-paper and a coating of cotton or the like adhesively held thereto by the tar of the paper, a portion of the strip and coating being corrugated, providing an outwardly-extending lengthened hood, and a supplemental coating of poisonous fluid laid over the cotton, substantially as set forth.

In testimony whereof I affix my signature in presence of two witnesses.

JULIUS SCHIRRA.

Witnesses:
C. M. CLARKE,
JAS. J. MCAFEE.